(12) United States Patent
Jia et al.

(10) Patent No.: US 8,953,039 B2
(45) Date of Patent: Feb. 10, 2015

(54) SYSTEM AND METHOD FOR AUTO-COMMISSIONING AN INTELLIGENT VIDEO SYSTEM

(75) Inventors: Zhen Jia, Shanghai (CN); Jianwei Zhao, Shanghai (CN); Penghe Geng, East Hartford, CT (US); Ziyou Xiong, Wethersfield, CT (US); Jie Xi, East Hartford, CT (US); Zhengwei Jiang, East Hartford, CT (US); Alan Matthew Finn, Hebron, CT (US)

(73) Assignee: UTC Fire & Security Corporation, Farmington, CT (US)

( * ) Notice: Subject to any disclaimer, the term of this patent is extended or adjusted under 35 U.S.C. 154(b) by 549 days.

(21) Appl. No.: 13/175,540

(22) Filed: Jul. 1, 2011

(65) Prior Publication Data

US 2013/0002863 A1 Jan. 3, 2013

(51) Int. Cl.
*H04N 7/18* (2006.01)
*G06K 9/62* (2006.01)

(52) U.S. Cl.
CPC .................... *G06K 9/6264* (2013.01)
USPC ........ 348/143; 348/139; 348/222.1; 348/571; 382/103; 382/173; 382/174; 382/224; 709/217; 725/105

(58) Field of Classification Search
CPC ..... H04N 7/181; G08B 13/122; G06K 9/6264
USPC ................................ 348/143; 701/104.1, 769
IPC ......................................................... H04N 7/18
See application file for complete search history.

(56) References Cited

U.S. PATENT DOCUMENTS

| 5,909,548 A  * | 6/1999 | Klein et al. ............. 709/217 |
| 7,932,923 B2   | 4/2011 | Lipton et al. |
| 2004/0143602 A1* | 7/2004 | Ruiz et al. ............ 707/104.1 |
| 2005/0183128 A1* | 8/2005 | Assayag et al. .......... 725/105 |

(Continued)

FOREIGN PATENT DOCUMENTS

WO 2010122555 A1 10/2010

OTHER PUBLICATIONS

Hall et al: "Automatic parameter regulation of perceptual systems", Image and Vision Computing, Elsevier, Guildford, GB, volo 24, No. 8, Aug. 1, 2006, pp. 870-881, XP005597744, ISSN: 0262-8856, DOI: 10.1016/J.IMAVIS.2006.02.011.*

(Continued)

*Primary Examiner* — Jay Patel
*Assistant Examiner* — Neil Mikeska
(74) *Attorney, Agent, or Firm* — Cantor Colburn LLP

(57) ABSTRACT

An auto-commissioning system provides automatic parameter selection for an intelligent video system based on target video provided by the intelligent video system. The auto-commissioning system extracts visual feature descriptors from the target video and provides the one or more visual feature descriptors associated with the received target video to an parameter database that is comprised of a plurality of entries, each entry including a set of one or more stored visual feature descriptors and associated parameters tailored for the set of stored visual feature descriptors. A search of the parameter database locates one or more best matches between the extracted visual feature descriptors and the stored visual feature descriptors. The parameters associated with the best matches are returned as part of the search and used to commission the intelligent video system.

11 Claims, 3 Drawing Sheets

(56) References Cited

U.S. PATENT DOCUMENTS

| | | | |
|---|---|---|---|
| 2006/0120609 A1* | 6/2006 | Ivanov et al. | 382/224 |
| 2006/0143176 A1* | 6/2006 | Mojsilovic et al. | 707/6 |
| 2007/0019073 A1* | 1/2007 | Comaniciu et al. | 348/148 |
| 2008/0036860 A1 | 2/2008 | Addy | |
| 2009/0074184 A1 | 3/2009 | Baum et al. | |
| 2010/0002142 A1* | 1/2010 | Finn et al. | 348/571 |
| 2010/0293220 A1 | 11/2010 | Gennari et al. | |
| 2012/0011142 A1* | 1/2012 | Baheti et al. | 707/769 |
| 2012/0045090 A1* | 2/2012 | Bobbitt et al. | 382/103 |
| 2013/0057721 A1* | 3/2013 | Shmueli et al. | 348/222.1 |

OTHER PUBLICATIONS

Bose et al: "Learning to Use Scene Context for Object Classification in Surveillance", IEEE International Workshop on Visual Surveillance and Performance Evaluation of Tracking and Surveillance, Oct. 11, 2003, pp. 94-101, XP55041495.*

Shekhar et al: "Knowledge-based control of vision systems", Image and Vision Computing, vol. 17, No. 9, Jul. 1, 1999, pp. 667-683, XP55041496, ISSN: 0262-8856, DOI: 10.1016/80262-8856(98)00137-1.*

Unknown Author, "International Search Report and Written Opinion" dated Oct. 25, 2012, for PCT Application No. PCT/US2012/044833 filed Jun. 29, 2012, pp. 1-12, published worldwide by WIPO on their website.

Bose et al., "Learning to Use Scene Context for Object Classification in Surveillance", IEEE International Workshop on Visual Surveillance and Performance Evaluation of Tracking and Surveillance, Oct. 11, 2003, pp. 1-8, http://citeseerx.ist.psu.edu/viewdoc/download-?doi=10.1.1.10.1944&rep=rep1&type=pdf, accessed Oct. 17, 2012.

Hasan Celik, "Dominant Object Detection for Autonomous Vision-Based Surveillance", In: "Phd Thesis", Feb. 15, 2010, Tu Delft, pp. 1-165.

Hall et al., "Automatic Parameter Regulation of Perceptual Systems", Image and Vision Computing , Aug. 1, 2006, pp. 870-881, vol. 24, No. 8, Elsevier, Guildford, GB.

C. Shekhar et al., "Knowledge-Based Control of Vision Systems", Image and Vision Computing, Jul. 1, 1999, pp. 667-683, vol. 17, No. 9.

Stalder et al., "Exploring Context to Learn Scene Specific Object Detectors", IEEE International Workshop on Performance Evaluation of Tracking and Surveillance, Jun. 25, 2009, pp. 63-70 http://www.vision.ee.ethz.ch/~sstalder/publications/Stalder09ExploringConteztToLearnSceneSpecificObjectDetecors.pdf, accessed Oct. 17, 2012.

PCT International Report Preliminary Report on Patentability and Written Opinion of the International Searching Authority for International Application No. PCT/US2012/044833, Jan. 16, 2014, 8 pages.

* cited by examiner

SYSTEM AND METHOD FOR AUTO-COMMISSIONING AN INTELLIGENT VIDEO SYSTEM

BACKGROUND

The present invention is related to image processing and computer vision, and in particular to automatic commissioning of video analytic algorithms.

Intelligent video surveillance systems use image processing and computer vision techniques (i.e., video analytic software) to analyze video data provided by one or more video cameras. Based on the performed analysis, events are detected automatically without requiring an operator to monitor the data collected by the video surveillance systems.

However, the installation of intelligent video surveillance systems requires the video analytic software to be configured, including setting parameters associated with the video analytic software to optimize performance of the video analytic software in correctly identifying events in the analyzed video data. This process, known as commissioning the system, is time and labor intensive, typically requiring a technician to test different combinations of parameters.

SUMMARY

An auto-commissioning system provides automatic parameter selection and optimization for an intelligent video system based on target video provided by the intelligent video system. The auto-commissioning system extracts visual feature descriptors from the target video and provides the one or more visual feature descriptors associated with the received target video to an parameter database that is comprised of a plurality of entries, each entry including a set of one or more stored visual feature descriptors and associated parameters optimized for the set of stored visual feature descriptors. A search of the parameter database locates one or more best matches between the extracted visual feature descriptors and the stored visual feature descriptors. The optimized parameters associated with the best matches are returned as part of the search and used to commission the intelligent video system.

DETAILED DESCRIPTION

Figure 1:
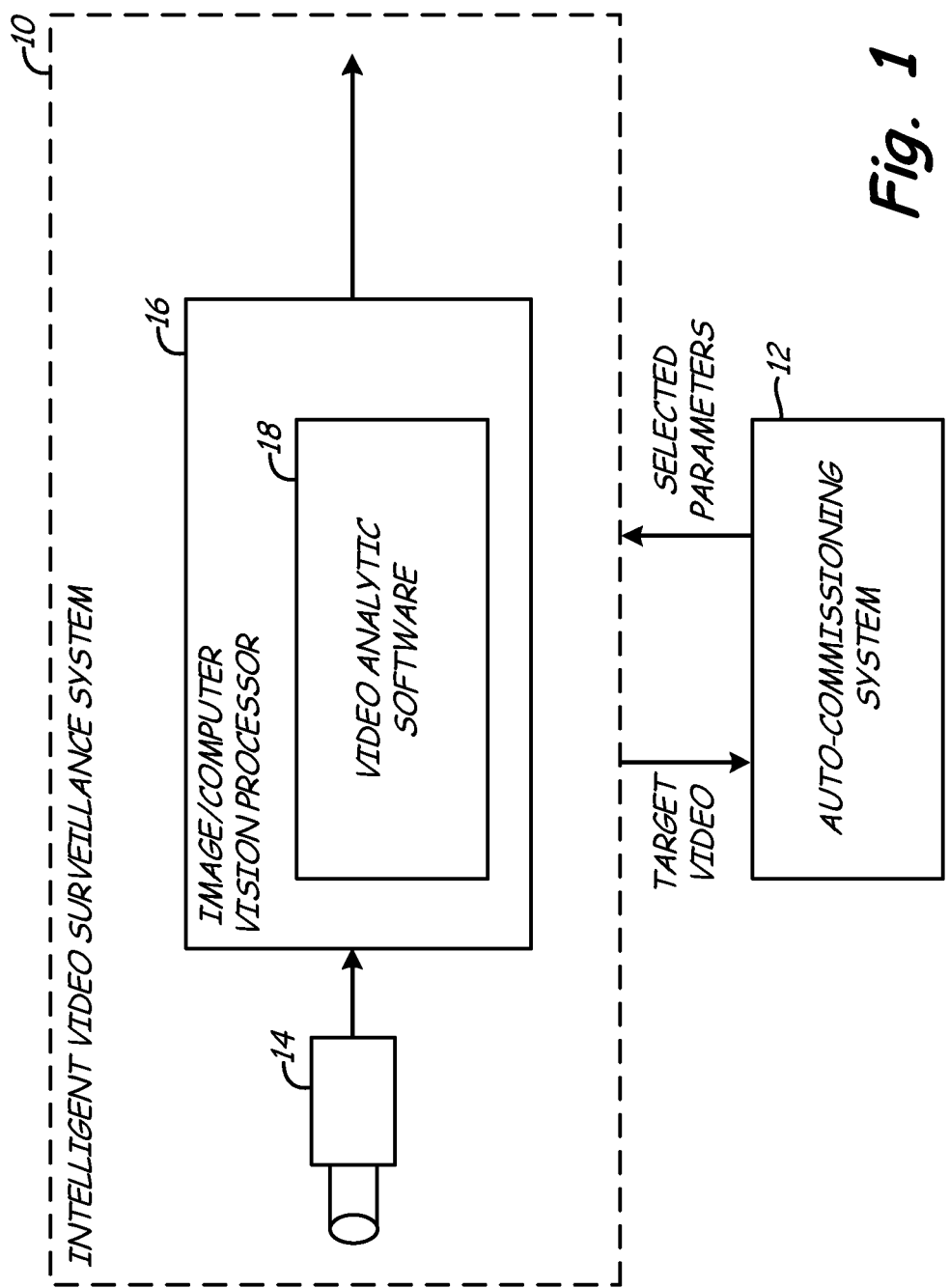
FIG. 1 is a block diagram of an intelligent video surveillance system and automatic commissioning system according to an embodiment of the present invention.

FIG. 1 is a block diagram of intelligent video surveillance system 10 and automatic commissioning system 12 according to an embodiment of the present invention. Intelligent video surveillance system 10 includes video camera 14 and image/computer vision processor 16. Video camera 14 captures images and/or video data for provision to image/computer vision processor 16, which executes video analytic software 18 to analyze the images and/or video data provided by video camera 14 to automatically detect objects/events within the field of view of video camera 14. Objects/events detected by video analytic software 18 may include object identification, object tracking, speed estimation, fire detection, intruder detection, etc, with respect to the received images and/or video data.

The performance of video analytic software 18 is tailored for a particular application (i.e., the environment in which the intelligent video system is installed and/or the type of detection to be performed by the intelligent video system) by varying a plurality of parameters associated with video analytic software 18. These parameters may include thresholds for decision making, adaptation rates for adaptive algorithms, limits or bounds on acceptable computed values, etc. The process of selecting the parameters of video analytic software 18 during initialization of intelligent video surveillance system 10 is referred to as commissioning the system. Typically, commissioning an intelligent video surveillance system is done manually by a technician, who tests different combinations of parameter values until the video analytic software correctly interprets test data provided. However, this process is time-consuming and therefore expensive.

In the embodiment shown in FIG. 1, auto-commissioning system 12 receives test video data from intelligent video system 10 and in response to the test video data acts to automatically select parameters for the commissioning of video analytic software 18, thereby obviating the need for a technician to test all combinations of parameters. The test video data may be provided directly from video camera 14, or may be provided via image/computer vision processor 16.

In general, auto-commissioning system 12 automatically extracts video feature descriptors (i.e., features that describe the video content) from the test video data. Video feature descriptors may include aspects such as illumination changes, presence of shadows, busy versus non-busy scene, background motion, camera vibration, etc. Visual feature descriptors may be binary in nature (e.g., either a scene is busy or non-busy), may be continuous and expressed by a range of values (e.g., illumination may be expressed as any number between 0-10), may be a probability distribution in space or time of some characteristic of the video (e.g., the distribution of shadows over some quantization of time), etc. For example, an outdoor surveillance system overlooking a park may include dramatic illumination changes, the presence of changing shadows, and be relatively busy. In contrast, a surveillance system employed in a museum hallway after hours may have no illumination changes, no shadows, and be non-busy. For each application, a different set of parameters will likely be employed to maximize performance.

Auto-commissioning system 12 extracts video feature descriptors from the test video data, and compares the extracted video feature descriptors to a parameter database that includes a plurality of combinations of video feature descriptors (describing different types of video data), each combination associated with parameters tailored to the combination of video feature descriptors. A best match between the extracted video feature descriptors and one of the plurality of combinations of video feature descriptors in the parameter database is determined, and the parameters associated with the best match is provided for provision to video analytic software 18.

In one embodiment, auto-commissioning system 12 is located in a centralized control room remote from intelligent video system 10. Test video data provided by intelligent video system 10 is communicated to centralized auto-commissioning system 12 for analysis, with parameters subsequently communicated from auto-commissioning system 12 to intelligent video system 10. Communication between devices may be wired or wireless, according to well known communication protocols (e.g., Internet, LAN). In other embodiments, auto-commissioning system 12 is portable/mobile (i.e., laptop or other mobile processing device), allowing a technician commissioning a system to connect auto-commissioning system 12 to intelligent video system 10 locally.

Figure 2:
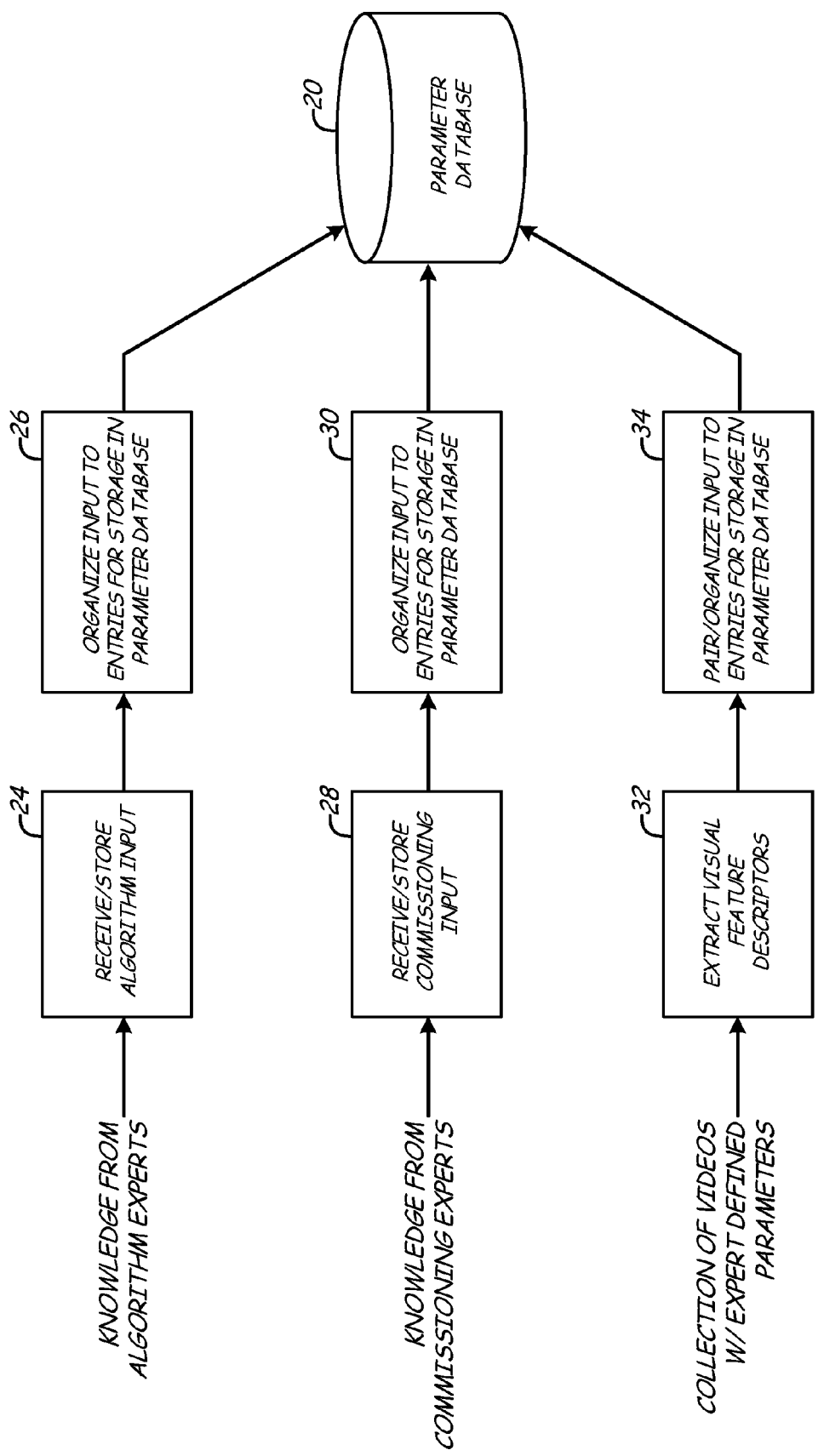
FIG. 2 is a block diagram illustrating generation of a parameter database according to an embodiment of the present invention.

FIG. 2 is a block diagram illustrating generation of parameter database 20 employed by auto-commissioning system 12 according to an embodiment of the present invention. In general, parameter database 20 stores a plurality of combinations of video feature descriptors. In addition, for each combination of different video feature descriptors, the parameter database stores a set of parameters tailored to the particular combination of video feature descriptors. In one embodiment, combinations of video feature descriptors and parameters making up each entry in the database are stored as vectors, with each video feature descriptor and parameter being assigned a particular position within the vector. During the auto-commissioning process, the feature descriptors extracted from the test video data are provided to parameter database for search and retrieval of a possible match between the extracted visual feature descriptors and stored visual feature descriptors. Parameters associated with the matched combination of feature descriptors are selected for auto-commissioning of the video analytic software 18. The matching of features in parameter database 20 may be by any of a number of well known means, e.g., by selecting the centroid of a cluster, by interpolating a functional approximation of the parameters in the database, etc.

Parameter database 20 is created by combining information from a plurality of different sources. In the embodiment shown in FIG. 2, inputs provided to create parameter database 20 include, but are not limited to: algorithm knowledge based on algorithms employed by the video analytic software 18, commissioning experience/knowledge of commissioning experts, and a collection of sample image/video data with expert defined parameters. One of the goals of parameter database 20 is the collection of knowledge, experience, and expertise provided by human experience into a subjective rules system used for automatically commissioning video analytic software.

Inputs provided to parameter database 20 are provided in a format that allows for comparison and matching (search and retrieval) based on visual feature descriptors. Inputs may be loaded manually by a user via a user interface such as a keyboard, or may be uploaded from a remote system. In some instances, rather than manually enter a plurality of visual feature descriptors defining a particular application (i.e., busy, non-busy, motion, no motion, etc.), actual video content may be provided as an input and a visual feature extractor operating on a computer system analyzes and extracts desired video feature descriptors. Visual feature descriptors, whether manually entered or extracted from actual videos are then paired with parameters tailored or selected for the identified visual feature descriptors. Each entry stored in parameter database 20 relates visual features associated with a particular video scene with a corresponding plurality of parameters. Commissioning of an intelligent video system then becomes a matter of extracting video features associated with the field of view of the intelligent video system (i.e., test video data) and comparing the extracted video features with those stored in parameter database 20 to find a match or best fit. The parameters associated with the matching entry and then selected as the parameters for the intelligent video system.

In the embodiment shown in FIG. 2, parameter database 20 is built with knowledge from algorithm experts, commissioning experts, and video database experts. Input from algorithm experts is provided/stored at step 24. As described above, input may be provided manually via a user interface (e.g., keyboard, monitor) or may be communicated as a stored file to a computer system associated with parameter database 20. Algorithm knowledge includes knowledge gained from studying the algorithms employed by video analytic software 18 to select parameters for different types of video feature descriptors. For example, analysis of an algorithm for detecting motion within the field of view of video camera 14 may indicate that performance of the algorithm is improved by modifying a particular parameter (e.g., gain) based on a particular video feature descriptor (e.g., illumination). Based on knowledge of the algorithms employed by the video analytic software, database entries can be created that relate various visual feature descriptors with particular parameter values. At step 26, input provided by algorithm experts is organized into entries that include a plurality of visual features (i.e. a set of visual features) describing a particular type of environment or conditions, and selected parameters for each set of visual features, and each entry is stored to parameter database 20. As described above, each entry may be stored in vector format, with each position of the vector defined by a particular video feature descriptor and parameter.

Expert/commissioning knowledge is provided at step 28, and includes information collected from experts regarding parameters associated with various visual features. Expert knowledge may be provided via a user interface, or may be provided as a stored file. For example, an expert may provide a database entry with respect to a certain combination of visual features (e.g., moving shadows, changing illumination) and the experts' opinion regarding parameters best suited for the visual features provided. At step 30, the input provided by experts is organized into entries that include a plurality of visual features (i.e., set of visual features) describing a particular type of environment or conditions, and selected parameters for each set of visual features. Each entry is then stored to parameter database 20. In this way, the experience/human knowledge of a commissioning expert is organized as part of parameter database 20.

A collection of videos with expert defined parameters is provided as another input to parameter database 20. In one embodiment, the collection of video content represents problematic videos that required expert analysis to determine the best parameter values. Visual feature descriptors are extracted from each video at step 32, and the parameters previously selected by experts are paired with the extracted visual features to create database entries that include the plurality of video feature descriptors and selected parameters for each video content sample in the collection at step 34. The database entries are then stored in parameter database 20. The features and parameters in database 20 may change over time as features are added or eliminated and as parameters are added or eliminated with the change of video analytics algorithms.

Entries created by each of the plurality of different inputs are stored to parameter database 20 to allow for subsequent search and retrieval of database entries. In one embodiment, duplicative entries (i.e., those entries having the same visual feature descriptors as other entries) may be combined with one another by averaging the parameter values associated with each duplicative entry or by deleting one of the entries. Other well known methods of handling duplicate, missing, or contradictory information in databases may also be used such as clustering or functional approximation.

Figure 3:
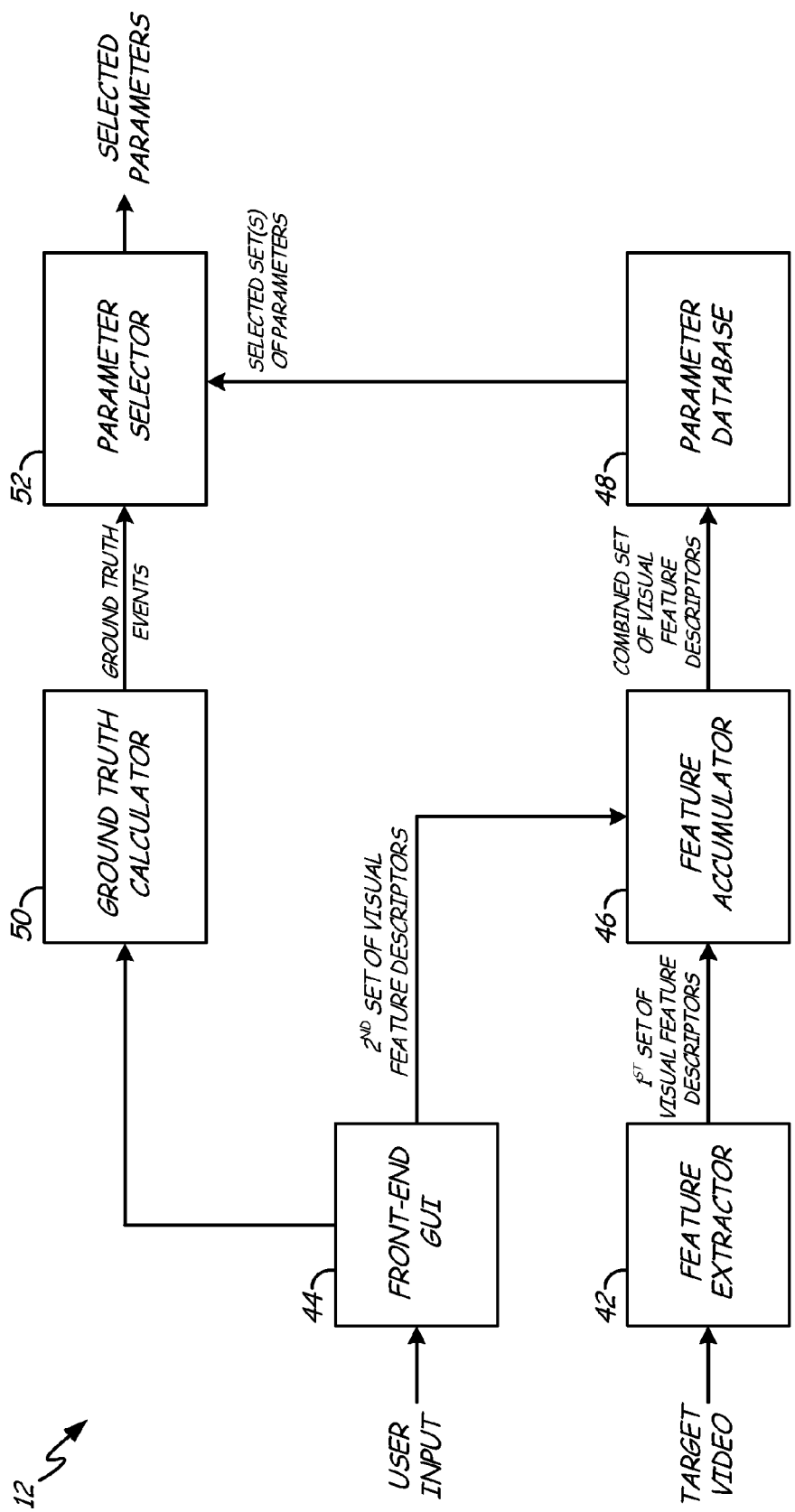
FIG. 3 is a flowchart illustrating a method of automatically commissioning the intelligent video surveillance system according to an embodiment of the present invention.

FIG. 3 is a block diagram illustrating functions performed by auto-commissioning system 12 to automatically commission intelligent video surveillance system according to an embodiment of the present invention. As described with respect to FIG. 1, target video provided by intelligent video system 10 is provided as an input to auto-commissioning system 12, and selected parameters are provided as an output by auto-commissioning system 12 to intelligent video system 10. In the embodiment shown in FIG. 3, auto-commissioning system 12 includes feature extractor 42, front-end graphical user interface (GUI) 44, feature accumulator 46, parameter database 48, ground truth calculator 50 and parameter selector 52.

Auto-commissioning system 12 receives target video from intelligent video surveillance system 10. Feature extractor 42 extracts visual feature descriptors from the target video provided by intelligent video system 10. In the embodiment shown in FIG. 3, the visual feature descriptors extracted by feature extractor 42 are saved as a first visual feature descriptor set. Various algorithms can be employed by feature extractor 42 to extract various visual features. For example, one algorithm may be employed to determine whether the scene is busy or non-busy, while another algorithm may be employed for shadow estimation, while another algorithm may be employed for detecting illumination changes. The algorithms selected for inclusion will generate a set of visual features that cover the most salient visual features with respect to the parameters used to optimize performance of video analytic software 18.

In addition to automatic extraction of visual feature descriptors, a user may manually provide input regarding visual feature descriptors associated with the target video via front-end GUI 44. The visual feature descriptors provided by a user via front-end GUI 44 are saved as a second visual feature descriptor. In other embodiments, visual feature descriptor input is provided only via automatic visual feature descriptor extraction, with no input required from the user.

If visual features descriptors are input from both a user and automatic visual feature extraction, then the first visual feature set and second visual feature set are combined by feature accumulator 46. The combination may include averaging of the first visual feature set with the second visual feature set, selection of maximum values within the first visual feature set and the second visual feature set, or other useful forms of combining the visual feature descriptor sets. The combined visual feature set is provided to parameter database 48 for search and retrieval of optimal parameters. In one embodiment, the combined visual features are organized into a vector as described with respect to FIG. 2 for comparison to database entries stored by parameter database 20.

Parameter database 48 searches for stored entries matching or most closely matching the received visual feature descriptors. There are a number of search and retrieval algorithms that may be employed to match the visual feature descriptors associated with the target video to the visual feature descriptors stored in parameter database 48. For example, search and retrieval methods such as Kd-Tree searches and R-Tree search may be employed. The Kd-Tree search is described in detail by the following publication: Michael S. Lew, Nicu Sebe, Chabane Djeraba, Ramesh Jain, *Content-based multimedia information retrieval: State of the art and challenges*, ACM Transactions on Multimedia Computer, Communication, and Applications (TOMCCAP), Volume 2, Issue 1 (February 2006), Pages: 1-19. The R-tree search is described in detail by the following publication: V. S. Subrahmanian, "Principles of Multimedia Database Systems", Morgan Kaufmann, January 1998. The results of the database search and retrieval are database entries having visual feature descriptors most closely matching the visual descriptors provided with respect to the target video.

In one embodiment, the parameters retrieved by parameter database 48 are provided directly to intelligent video surveillance system 10 for commissioning of the system. In the embodiment shown in FIG. 3, parameters or sets of parameters retrieved by parameter database 48 are provided to parameter selector 52 to test/verify selection of the selected parameters. That is, the parameters provided by parameter database 48 are employed as a starting point for a fast optimization of parameters. Ground truth calculator 50 receives and/or calculates ground truth events based on the target video. Ground truth events represent objects/events associated with the target video that are known to be true. For example, a user (via front-end GUI 44) may analyze video content and determine the speed of a particular object in the video. For an intelligent video surveillance system tasked with automatically analyzing video content to detect the speed of objects detected, this ground truth event (i.e., the speed of the car) can be used as a reference point for measuring or gauging the performance of intelligent video surveillance system 10. For example, if a ground truth event is defined as an object moving 10 mph, subsequent analysis of the same video content by intelligent video surveillance system 10 indicating that the car is moving 20 mph indicates an error or offset in the intelligent video surveillance system. In this way, ground truth events provide a baseline for comparing the output of video analysis performed with selected parameters.

In the embodiment shown in FIG. 3, parameter selector 52 includes video analytic software that can be configured with selected parameters retrieved by parameter database 48 and applied to target video for analysis. The results of the analysis performed (i.e., events/objects detected as a result of the analyzed video data) is compared with ground truth events defined with respect to the target video. True exhaustive testing requires each combination of parameters to be analyzed and compared to desired results (i.e., ground truth events) to select parameters, which is a time-consuming process. In the present invention, exhaustive testing is avoided by using the set(s) of selected parameters provided by parameter database 48 as a starting point for what is referred to as fast testing. For each set of parameters provided by parameter database 48, various functions associated with the video analytic software are tested and results (i.e., event/object detection provided by video analytic software) are compared to ground truth results.

Based on the difference between the video analytic results and the ground truth results, parameter selector 52 calculates a performance value(s) with respect to the current set of selected parameters. Fast parameter selector 52 compares the current performance value with previously measured performance values associated with different sets of selected parameters, and uses the difference between the measured performance values (i.e., a parameter gradient) to select a next set of parameters to test.

For example, parameter selector 52 analyzes the target video with a first set of parameters retrieved by parameter database 48 and results are compared to the defined ground truth to define first performance values, and a second set of parameters retrieved by parameter database 48 (or selected based on the results of a previous set) and results are compared to the defined ground truth to define second performance values. The first and second set of performance values are compared to one another to define a parameter gradient that is used by parameter selector 52 to select a subsequent set of parameters to test. When the performance values indicate a threshold level of performance, the process ends and the selected parameters are provided to intelligent video surveillance system 10 for commissioning. When the performance values do not indicate a threshold level of performance, a new set of parameters are chosen by any of a number of well known optimization algorithms.

The system and method described with respect to FIG. 3 therefore provides fast, automatic commissioning of video analytic software. Visual features or descriptors associated with the system to be commissioned (i.e. target video) are extracted. One or more sets of parameters are selected by comparing the visual features/descriptors to a visual features/descriptors stored in a database and associated with parameters. Testing of selected parameters allows the best set of parameters to be selected for commissioning of intelligent video surveillance system 10.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of automatically commissioning an intelligent video system, the method comprising:
   receiving a target video that includes images and/or video data associated with the intelligent video system to be commissioned;
   extracting a first set of one or more visual feature descriptors associated with the received target video;
   providing the one or more visual features descriptors to a parameter database that is comprised of a plurality of entries, each entry including a set of one or more stored visual feature descriptors and associated parameters tailored for the set of stored visual feature descriptors;
   searching the parameter database based on the extracted visual feature descriptors to locate one or more best matches between the extracted visual feature descriptors and the stored visual feature descriptors and retrieving the one or more sets of selected parameters associated with the one or more best matches;
   installing the retrieved set of parameters in the intelligent video system;
   testing performance of the one or more sets of selected parameters to find a best match set of parameters in response to an event output generated with respect to one of the one or more of sets of parameters by application of the one or more sets of selected parameters to video content; and
   manually analyzing the target video to identify one or more ground truth events that represent correct analysis of the target video;
   wherein the best match set of parameters is used to commission the intelligent video system for video surveillance;
   wherein testing the performance of the one or more sets of parameters includes:
   A. analyzing the target video with video analytic software configured with one of the plurality of sets of parameters to generate an event output;
   B. comparing the event output generated with respect to one of the plurality of sets of parameters with the one or more ground truth events to calculate performance parameters that define the performance of the selected set of parameters; and
   C. selecting a subsequent set of parameters based on the performance parameters associated with the analyzed set of optimized values; and
   D. repeating steps A through C until the generated performance parameters are satisfactory.

2. The method of claim 1, wherein the parameter database is created from a plurality of sources, including at least one of a collection of video content from which a plurality of visual feature descriptors are extracted and associated with parameters previously selected with respect to each video content in the collection, commissioning knowledge of experts who input a plurality of visual feature descriptors and parameters based on previous commissioning experience, and algorithm knowledge of experts who input a plurality of visual feature descriptors and parameters based on knowledge of algorithms employed by the intelligent video system.

3. The method of claim 1, wherein extracting a first set of one or more visual feature descriptors includes applying one or more feature extraction algorithms to the target video, wherein each algorithm estimates or measures a different visual feature descriptor associated with the target video.

4. The method of claim 3, wherein the one or more feature extraction algorithms include algorithms for extracting visual feature descriptors selected from the group comprising:
   scene busyness, shadow estimation, illumination, camera vibration, background motion, contrast, texture, and combinations of these features.

5. The method of claim 1, wherein searching the parameter database includes:
   returning a best match between the extracted visual feature descriptors and the stored visual feature descriptors; and
   selecting nearest neighbors associated with the best match to provide a plurality of sets of parameters.

6. The method of claim 1, wherein selecting a subsequent set of parameters based on the performance parameters includes:
   providing the calculated performance parameters to an optimization algorithm that compares the calculated performance parameters to previously calculated performance parameters.

7. An auto-commissioning system for automatically commissioning an intelligent video surveillance system, the auto-commissioning system comprising:
   an input that receives target video that includes images and/or video data associated with the intelligent video system to be commissioned;
   a video feature extractor that extracts a first set of one or more visual feature descriptors associated with the received target video;
   an parameter database that is comprised of a plurality of entries, each entry including a set of one or more stored visual feature descriptors and associated parameters tailored for the set of stored visual feature descriptors, wherein the parameter database is searched based on the first set of one or more visual feature descriptors to obtain retrieved parameters;
   a parameter selector testing performance of the retrieved parameters to find a best match retrieved parameters in response to an event output generated with respect to the retrieved parameters by application of the retrieved parameters to video content; and
   a ground truth calculator that calculates ground truth events that represent correct analysis of the target video and
   wherein the best match retrieved parameters are used to commission the intelligent video system for video surveillance;

wherein testing the performance of the one or more sets of parameters includes:

A. analyzing the target video with video analytic software configured with one of the plurality of sets of parameters to generate an event output;

B. comparing the event output generated with respect to one of the plurality of sets of parameters with the one or more ground truth events to calculate performance parameters that define the performance of the selected set of parameters; and C. selecting a subsequent set of parameters based on the performance parameters associated with the analyzed set of optimized values; and D. repeating steps A through C until the generated performance parameters are satisfactory.

8. The auto-commissioning system of claim 7, wherein the parameter database is created from a plurality of sources, including at least one of a collection of video content from which a plurality of visual feature descriptors are extracted and associated with parameters previously selected with respect to each video content in the collection, commissioning knowledge of experts who input a plurality of visual feature descriptors and parameters selected based on previous commissioning experience, and algorithm knowledge of experts who input a plurality of visual feature descriptors and parameters based on knowledge of algorithms employed by the intelligent video system.

9. The auto-commissioning system of claim 7, wherein:

the parameter selector configured to test performance of the retrieved parameters from the parameter database and compare performance of the retrieved parameters with ground truth events associated with the target video, wherein based on the comparison the parameter selector selects a subsequent set of parameters to test until a satisfactory set of parameters is identified.

10. The auto-commissioning system of claim 7, further including:

a graphical user interface that receives input from a user regarding ground truth events associated with the target video.

11. The auto-commissioning system of claim 6, further including:

a graphical user interface that receives input from a user regarding a second set of visual feature descriptors associated with the target video; and a feature accumulator for combining the first set of visual feature descriptors with the second set of visual feature descriptors to provide a combined set of visual feature descriptors for provision to the parameter database.

* * * * *